(12) United States Patent
Ohlbach et al.

(10) Patent No.: US 6,699,960 B1
(45) Date of Patent: Mar. 2, 2004

(54) METHOD FOR PRODUCING POLYAMIDES FROM DINITRILES AND DIAMINES

(75) Inventors: Frank Ohlbach, Dossenheim (DE); Hermann Luyken, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 25 days.

(21) Appl. No.: 10/048,246

(22) PCT Filed: Jul. 11, 2000

(86) PCT No.: PCT/EP00/06566

§ 371 (c)(1), (2), (4) Date: Jan. 29, 2002

(87) PCT Pub. No.: WO01/09224

PCT Pub. Date: Feb. 8, 2001

(30) Foreign Application Priority Data

Jul. 30, 1999  (DE) .......................................... 199 35 398

(51) Int. Cl.$^7$ .......................... C08G 69/00; C08G 69/28
(52) U.S. Cl. ....................... 528/310; 528/312; 528/323; 528/324; 528/335; 528/336
(58) Field of Search ................................ 528/310, 312, 528/332, 335, 336, 323, 320, 324

(56) References Cited

U.S. PATENT DOCUMENTS

| | | | | |
|---|---|---|---|---|
| 6,194,538 B1 | * | 2/2001 | Weiss et al. ................. | 528/310 |
| 6,310,173 B1 | * | 10/2001 | Mohrschladt et al. ....... | 528/310 |
| 6,359,020 B1 | * | 3/2002 | Mohrschladt ............... | 528/310 |
| 6,509,439 B1 | * | 1/2003 | Hayes et al. ................ | 528/310 |

* cited by examiner

Primary Examiner—P. Hampton Hightower
(74) Attorney, Agent, or Firm—Keil & Weinkauf (57) ABSTRACT

A polyamide is prepared by reacting at least one dinitrile and at least one diamine with water at a temperature from 90 to 400° C. and a pressure from 0.1 to $50*10^6$ Pa in a molar ratio of at least 1:1 for water to the sum total of dinitrile and diamine in the presence of a heterogeneous catalyst selected from the group consisting of aluminum oxide, tin oxide, silicon oxide, oxides of the second to sixth transition group of the periodic table, oxides of the lanthanides and actinides, sheet-silicates and zeolites.

21 Claims, 1 Drawing Sheet

Fig. 1

METHOD FOR PRODUCING POLYAMIDES FROM DINITRILES AND DIAMINES

DESCRIPTION

The present invention relates to a process for preparing polyamides from dinitriles and diamines and water at elevated temperature and elevated pressure.

It is an object of the present invention to provide a process for preparing polyamides from dinitriles and diamines and water in a good space-time yield with straightforward catalyst removal.

We have found that this object is achieved by a process for preparing a polyamide by reacting at least one dinitrile and at least one diamine with water at a temperature from 90 to 400° C. and a pressure from 0.1 to 50*10$^6$ Pa in a molar ratio of at least 1:1 for water to the sum total of dinitrile and diamine in the presence of a heterogeneous catalyst selected from the group consisting of aluminum oxide, tin oxide, silicon oxide, oxides of the second to sixth transition group of the periodic table, oxides of the lanthanides and actinides, sheet-silicates and zeolites.

The invention further provides a continuous process for preparing a polyamide by reacting at least one dinitrile and at least one diamine with water, which comprises:

(1) reacting at least one dinitrile and at least one diamine with water at a temperature from 90 to 400° C. and a pressure from 0.1 to 35×10$^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure in stage 1 in the presence or absence of a Brönsted acid catalyst selected from a beta-zeolite catalyst, a sheet-silicate catalyst or titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phases, and the first gas phase is separated from the first liquid or the first solid phase or from the mixture of first liquid and first solid phases, and (3) admixing the first liquid or the first solid phase or the mixture of first liquid and first solid phases with a gaseous or liquid phase comprising water at a temperature from 150 to 370° C. and a pressure from 0.1 to 30×10$^6$ Pa to obtain a product mixture.

The invention further provides a continuous process for preparing a polyamide by reacting at least one dinitrile and at least one diamine with water, which comprises:

(1) reacting at least one dinitrile and at least one diamine with water at a temperature from 90 to 400° C. and a pressure from 0.1 to 35×10$^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure in stage 1 in the presence or absence of a Brönsted acid catalyst selected from a beta-zeolite catalyst, a sheet-silicate catalyst or titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phases, and so that the first gas phase is separated from the first liquid or the first solid phase or from the mixture of first liquid and first solid phases, and (3) admixing the first liquid or the first solid phase or the mixture of first liquid and first solid phases with a gaseous or liquid phase comprising water at a temperature from 150 to 370° C. and a pressure from 0.1 to 30×10$^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide maybe replaced by tungsten oxide to obtain a product mixture.

The above processes preferably further comprise the following stage:

(4) postcondensing the product mixture at a temperature from 200 to 350° C. and a pressure which is lower than the pressure in stage 3, the temperature and pressure being selected so as to obtain a second, water- and ammonia-containing gas phase and a second liquid or second solid phase or a mixture of second liquid and second solid phases, which each include the polyamide.

The invention further provides a continuous process for preparing a polyamide by reacting at least one dinitrile and at least one diamine with water, which comprises:

(1) reacting at least one dinitrile and at least one diamine with water at a temperature from 90 to 400° C. and a pressure from 0.1 to 35×10$^6$ Pa in a flow tube containing a Brönsted acid catalyst selected from a beta-zeolite catalyst, a sheet-silicates catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure in stage 1 in the presence or absence of a Brönsted acid catalyst selected from a beta-zeolite catalyst, a sheet-silicate catalyst or titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or first solid phase or a mixture of first solid and first liquid phases, and so that the first gas phase is separated from the first liquid or the first solid phase or from the mixture of first liquid and first solid phases, and (4) postcondensing the first liquid or the first solid phase or the mixture of first liquid and first solid phases at a temperature from 200 to 350° C. and a pressure which is lower than the pressure in stage 3, the temperature and pressure being selected so as to obtain a second, water- and ammonia-containing gas phase and a second liquid or second solid phase or a mixture of second liquid and second solid phases, which each include the polyamide.

The principle of the process of the invention is described in prior DE-A-19 804 023, unpublished at the priority date of the present invention.

The dinitrile used may in principle be any dinitrile, i.e., any compound containing at least two nitrile groups, singly or mixed, alpha,omega-Dinitriles are preferred, especially alpha,omega-alkylenedinitriles having from 3 to 12 carbon atoms, more preferably from 3 to 9 carbon atoms, in the alkylene moiety, or alkylaryl dinitriles having from 7 to 12 carbon atoms, preferred alkylaryl dinitriles being alkylaryl dinitriles which have an alkylene group of at least one carbon atom between the aromatic unit and the two nitrile groups. Especially preferred, alkylaryl dinitriles are those which have the two nitrile groups in the 1,4 position relative to each other.

Useful alpha,omega-alkylenedinitriles preferably further include linear alpha,omega-alkylenedinitriles in which the alkylene moiety (—$CH_2$—) preferably contains from 3 to 11 carbon atoms, more preferably from 3 to 9 carbon atoms, such as 1,3-dicyanoprope, 1,4-dicyanobutane (adiponitrile, ADN), 1,5-dicyanopentane, 1,6-dicyanohexane, 1,7-dicyanoheptane, 1,8-dicyanooctane, 1,9-dicyannonane, particularly preferably adiponitrile, adiponitrile may be obtained in a conventional manner by double catalytic addition of HCN to butadiene.

It will be appreciated that it is also possible to use mixtures of a plurality of dinitriles or mixtures of a dinitrile with further comonomers, such as dicarboxylic acids, for example adipic acid.

The diamine used may in principle be any diamine, i.e., any compound containing at least two amino groups, singly or mixed, alpha,omega-Diamines are preferred, especially alpha,omega-alkylenediamines having from 3 to 14 carbon atoms, more preferably from 3 to 10 carbon atoms, in the alkylene moiety, or alkylaryl diamines having from 9 to 14 carbon atoms, preferred alkylaryl diamines being alkylaryl diamines which have an alkylene group of at least one carbon atom between the aromatic unit and the two amino groups. Especially preferred alkylaryl diamines are those which have the two amino groups in the 1,4 position relative to each other.

Useful alpha,omega-alkylenediamines preferably further include linear alpha,omega-alkylenediamines in which the alkylene moiety (—$CH_2$—) preferably contains from 3 to 14 carbon atoms, more preferably from 3 to 10 carbon atoms, such as 1,3-diaminopropane, 1,4-diaminobutane, 1,5-diaminopentane, 1,6-diaminohexane (hexamethylenediamine, HMD), 1,7-diaminoheptane, 1,8-diaminooctane, 1,9-diaminononane, 1,10-dicyanodecane, particularly preferably hexamethylenediamine.

Hexamethylendiamine may be obtained in a conventional manner by double catalytic hydrogenation of the nitrile groups of adiponitrile.

The diamine may advantageously be used in the form of a solution in water.

It will be appreciated that it is also possible to use mixtures of a plurality of diamines or mixtures of a dinitrile with further comonomers.

The molecular ratio of dinitrile to diamine (dinitrile in the quantitative specifications hereinbelow subsuming the sum total of dinitrile and any dinitrile equivalents used, i.e., any compounds which react like a dinitrile under the process conditions of the invention, such as dicarboxylic acids, and diamine in the quantitative specifications hereinbelow subsuming the sum total of diamine and any diamine equivalents used, i.e., compounds which react like a diamine under the process conditions of the invention) should advantageously be within the range from 0.5 to 2, preferably 0.8 to 1.2, especially 1.

In a particular embodiment, especially if copolyamides or branched or chain-extended polyamides are to be prepared, the following mixture is used instead of pure dinitrile and pure diamine:

from 50 to 99.99%, preferably from 80 to 90%, by weight of total dinitrile and diamine, from 0.01 to 50%, preferably from 1 to 30%, by weight of at least one dicarboxylic acid, selected from the group consisting of aliphatic $C_4$–$C_{10}$-α,ω-dicarboxylic acids, aromatic $C_8$–$C_{12}$ dicarboxylic acids and $C_5$–$C_8$ cycloalkanedicarboxylic acids, from 0 to less than 50%, preferably from 0 to 30%, by weight of an aminonitrile and also from 0 to 50%, preferably from 0 to 30%, by weight of an α,ω-$C_5$–$C_{12}$-amino acid or of the corresponding lactam, from 0 to 10% by weight of at least one inorganic acid or salt thereof, the individual weight percentages adding up to 100%.

Useful dicarboxylic acids include aliphatic $C_4$–$C_{10}$ α,ω-dicarboxylic acids, such as succinic acid, glutaric acid, adipic acid, pimelic acid, suberic acid, azelaic acid, sebacic acid, preferably adipic acid and sebacic acid, paticularly preferably adipic acid, and aromatic $C_8$–$C_{12}$ dicarboxylic acids such as terephthalic acid and. also $C_5$–$C_8$ cycloalkanedicarboxylic acids such as cyclohexanedicarboxylic acid.

It is further possible to use salts of the aforementioned dicarboxylic acids and diamines, especially the salt of adipic eacid and hexnmethylenediamine:, which is known as 66 salt.

The aminonitrile used may in principle be any aminonitrile, i.e., any compound containing both at least one amino group and at least one nitrile group, singly or mixed. ω-aminonitriles are preferred, especially ω-aminoalkyl nitrites having from 4 to 12 carbon atoms, more preferably from 4 to 9 carbon atoms, in the alkylene moiety, or an aminoalkylaryl nitrile having from 8 to 13 carbon atoms, preferred aminoalkylaryl nitrites being aminoalkylaryl nitrites which have an alkylene group of at least one carbon atom between the aromatic unit and the amino and nitrile group. Especially preferred aminoalkylaryl nitriles are those which have the amino group and nitrile group in the 1,4 position relative to each other.

The ω-aminoalkyl nitrile used is preferably a linear ω-aminoalkyl nitrile in which the alkylene moiety (—$CH_2$—) preferably contains from 4 to 12 carbon atoms, more preferably from 4 to 9 carbon atoms, such as 6-amino-1-cyanopentane (6-aminocapronitrile), 7-amino-1-cyanohexane, 8-amino-1-cyanoheptane, 9-amino-1-cyanooctane, 10-amino-1-cyanononane, particularly preferably 6-aminocapronitrile.

6-Aminocapronitrile is customarily obtained by hydrogenation of adiponitrile according to known methods, described for example in DE-A 836,938, DE-A 848,654 or U.S. Pat. No. 5,151,543.

Of course, it is also possible to use mixtures of a plurality of amnonitriles or mixtures of an aminonitrile with further comonomers.

If desired, it is also possible to use diamines, dinitriles and aminonitriles derived from branched alkylene or arylene or alkylarylene compounds.

The α,ω-$C_5$-$C_{12}$-amino acid used can be 5-aminopentanoic acid, 6-aminohexanoic acid, 7-aminoheptanoic acid, 8 aminooctanoic acid, 9-aminononanoic acid, 10-aminodecanoic acid, 11-aminoundecanoic acid or 12-aminododecanoic acid, preferably 6-aminohexanoic acid.

The process of the invention is carried out at temperatures from 90 to 400° C., advantageously from 150 to 350° C., at pressures from 0.1 to $50*10^6$ Pa.

The heterogeneous catalysts used may be oxides selected from the group consisting of aluminum oxide, tin oxide, silicon oxide as pyrogenic silica, silica gel, diatomaceous earth, quartz, sheet-silicate or mixtures thereof, also oxides of metals of the second to sixth transition group of the periodic table such as titanium dioxide, amorphous, as anatase or rutile, zirconium oxide, zinc oxide, oxides of the lanthanides and actinides, such as cerium oxide, thorium oxide, praseodymium oxide, samarium oxide, rare earth mixed oxides or mixtures thereof.

Useful catalysts further include:

vanadium oxide, niobium oxide, iron oxide, chromium oxide, molybdenum oxide, tungsten oxide or mixtures thereof. Mixures between the oxides mentioned are likewise possible. Some sulfides, selenides and tellurides such as zinc telluride, tin selenide, molybdenum sulfide, tungsten sulfide, sulfides of nickel, of zinc and of chromium may also be used.

The aforementioned compounds may be doped with or include compounds of the $1^{st}$ and $7^{th}$ main groups of the periodic table.

Useful catalysts further include zeolites, such as beta-zeolites, phosphates and heteropolyacids, and also acidic and alkaline ion exchangers, for example, Naphion®.

If appropriate, these catalysts may include up to 50% by weight each of copper, tin, zinc, manganese, iron, cobalt, nickel, ruthenium, palladium, platinum, silver or rhodium.

Preference is given to catalysts selected from the group consisting of beta-zeolite, sheet-silicate and especially titaniumdioxide advantageously comprising from 70 to 100% by weight of anatase and from 0 to 30% by weight of rutile, in which catalyst up to 40% by weight of titanium dioxide may be replaced by tungsten oxide, or mixtures thereof. Such catalysts are particularly preferred if they are capable of acting as a Brönsted acid.

Depending on their composition, catalysts may be used with or without a support. For instance, titanium dioxide may be used as a titanium dioxide extrudate or as titanium dioxide applied in a thin layer to a support. To apply titanium dioxide to a support such as silicon dioxide, aluminum oxide or zirconium dioxide it is possible to use any method described in the literature. For instance, a thin titanium dioxide layer may be applied by hydrolyzing organotitanium compounds such as titanium isopropoxide or titanium butoxide or by hydrolyzing $TiCl_4$ or other inorganic titanium compounds. Titanium dioxide sols may also be used.

Further suitable compounds are zirconyl chloride, aluminum nitrate and cerium nitrate.

Useful supports are powders, extrudates or tablets of the aforementioned oxides themselves or other stable oxides such as silicon dioxide. The supports used may be macroporous to improve the mass transport.

The process of the invention may be operated continuously or batchwise.

In the process of the invention, water is used in a molar ratio of at least 1:1, advantageously within the range from 1:1 to 1:10, particularly preferably from 1:2 to 1:8, most preferably from 1:2 to 1:6, relative to the sum total of dinitrile and diamine, and it is preferred to us an excess of water based on the sum total of dinitrile and diamine.

In an advantageous embodiment, the first stage (stage 1) involves heating at least one dinitrile and at least one diamine with water at a temperature from about 90 to about 400° C., preferably from about 180 to about 310° C., especially from about 220 to about 270° C., while a pressure from about 0.1 to about $15 \times 10^6$ Pa, preferably from about 1 to about $10 \times 10^6$ Pa, especially from about 4 to about $9 \times 10^6$ Pa, is set. In this stage, the pressure and temperature can be adjusted relative to each other in such a way as to obtain a liquid or a solid phase and a mixture of liquid or solid phases and a gaseous phase.

In this embodiment, the liquid or solid phase or the mixture of liquid and solid phases corresponds to the reaction mixture, whereas the gaseous phase is separated off. As part of this stage, the gaseous phase can be separated from the liquid or solid phase or from the mixture of solid or liquid phase at once, or the synthesis mixture forming within this stage can be present in two-phase form: liquid/gaseous, solid/gaseous or liquid-solid/gaseous. Of course, the pressure and temperature can also be adjusted relative to each other in such a way that the synthesis mixture is present as a single solid or liquid phase.

The removal of the gas phase can be effected by the use of stirred or unstirred separating vessels or vessel batteries and by the use of evaporator apparatus, for example by means of circulatory evaporators or thin-film evaporators, e.g., filmtruders, or by means of annular disk reactors, which ensure an enlarged phase interface. In certain cases, recirculation of the synthesis mixture or the use of a loop reactor may be necessary to increase the phase interface. Furthermore, the removal of the gas phase can be furthered by the addition of water vapor or inert gas into the liquid phase.

Preferably, the pressure is adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

The two-phase procedure is preferably carried out at a pressure which is greater than the vapor pressure of pure water corresponding to the bulk temperature of the synthesis mixture, but less than the equilibrium vapor pressure of ammonia.

A particularly preferred embodiment of the two-phase procedure utilizes an upright flow tube which is operated under upward flow and optionally has above the product outlet a further opening for gas phase removal. This tubular reactor can be fully or partially packed with catalyst pellets. In a preferred embodiment, the upright reactor utilized in the two-phase procedure is maximally packed with catalyst material up to the phase boundary.

In another, particularly preferred embodiment of the first stage, the pressure is selected in such a way that the synthesis mixture is present as a single liquid phase, i.e., no gas phase is present in the reactor. For this single-phase procedure, the preferred embodiment is a flow tube packed exclusively with catalyst material.

Advantageously, the dinitrile/diamine/water mixture may be heated with a heat exchanger before being introduced to the first stage. It will be appreciated that the dinitrile, diamine and water may also be heated separately from each other and be mixed in the first stage by means of mixing elements.

As regards the residence time of the synthesis mixture in the first stage, there are no restrictions whatsoever; however, it is generally selected within the range from about 10 minutes to about 10 hours, preferably within the range from about 30 minutes to about 6 hours.

Although there are no restrictions whatsoever concerning the degree of conversion of nitrile groups in stage 1 either, economic reasons especially dictate that the conversion of nitrile groups in stage 1 be generally not less than about 70 mol %, preferably at least about 95 mol %, and especially within the range from about 97 to about 99 mol %, each based on the moles of dinitrile and diamine used.

The nitrile group conversion is customarily determined by means of IR spectroscopy (CN stretching vibration at 2247 wavenumbers), NMR or-HPLC, preferably by IR spectroscopy.

Nor does the invention rule out conducting the reaction in stage 1 in the presence of oxygen-containing phosphorus compounds, especially phosphoric acid, phosphorous acid and hypophosphorous acid and alkali metal and alkaline earth metal salts and ammonium salts thereof such as $Na_3PO_4$, $NaH_2PO_4$, $Na_2RPO_4$, $NaH_2PO_3$, $Na_2HPO_3$, $NaH_2PO_2$, $K_3PO_4$, $KH_2PO_4$, $K_2HPO_4$, $KH_2PO_3$, $K_2HPO_3$, $KH_2PO_2$, in which case the molar ratio of the sum total of dinitrile and diamine to phosphorus compounds is selected within the range from 0.01:1 to 1:1, preferably within the range from 0.01:1 to 0.1:1.

The reaction in stage 1 is carried out in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide. If a very pure dinitrile and a very pure dimine are used, the proportion of anatase in the titanium dioxide catalyst should be as high as possible. Preferably, a pure anatase catalyst is used. If the dinitrile or the diamine used contains impurities, for example from 1 to 3% by weight of impurities, preference is given to using a titanium dioxide catalyst comprising a mixture of anatase and rutile. Preferably, the proportion of anatase is from 70 to 80% by weight and the proportion of rutile from 20 to 30% by weight. Particular preference is given in this case to using a titanium dioxide catalyst comprising about 70% by weight of anatase and about 30% by weight of rutile. The catalyst preferably has a pore volume of from 0.1 to 5 ml/g, particularly preferably from 0.2 to 0.5 ml/g. The average pore diameter is preferably within the range from 0.005 to 0.1 $\mu$m. particularly preferably within the range from 0.01 to 0.06 $\mu$m. If highly viscous products are used, the average pore diameter should be large. The cutting hardness is preferably greater than 20 N, particularly preferably >25 N. The BET surface area is preferably more than 40 m²/g, particularly preferably more than 100 m²/g. If the BET surface area is smaller, the bed volume should be appropriately higher to ensure adequate catalyst activity. Particularly preferred catalysts have the following properties: 100% of anatase; 0.3 ml/g pore volume; 0.02 $\mu$m average pore diameter; 32 N cutting hardness; 116 m²/g BET surface area or 84% by weight of anatase; 16% by weight of rutile; 0.3 ml/g pore volume; 0.03 $\mu$m average pore diameter; 26 N cutting hardness; 46 m²/g BET surface area. The catalysts may be prepared from commercial powders as available for example from Degussa, Finti or Kemira. When tungsten oxide isused, up to 40% by weight, preferably up to 30% by weight, particularly preferably from 15 to 25% by weight of the titanium dioxide is replaced by tungsten oxide. The catalysts can be prepared as described in Ertl, Knözinger, Weitkamp: "Handbook of heterogeneous catalysis", VCH Weinheim, 1997, pages 98ff. The catalyst can be used in any desired suitable form. It is preferably used in the form of shaped articles, extrudates or pellets, especially in the form of pellets. The pellets are preferably sufficiently large to be readily separable from the product mixture and not to impair the flowability of the product during the reaction.

The pellet form of the catalyst makes it possible to remove the catalyst mechanically at the point of exit from the first stage. For example, mechanical filters or sieves are provided at the point of exit from the first stage. If the catalyst is additionally used in the second and/or third stage, it is preferably present in the same form.

According to the invention, the reaction mixture obtained in the first stage is further reacted in stage 2 at a temperature from about 200 (150) to about 350 (400)° C., preferably at a temperature within the range from about 210 (200) to about 330 (330)° C., especially within the range from about 230 (230) to about 270 (290)° C., and a pressure which is lower than the pressure in stage 1. The pressure in stage 2 is preferably at least about 0.5×10⁶ Pa lower than the pressure in stage 1, and generally the pressure will be within the range from about 0.1 to about 45×10⁶ Pa, preferably within the range from about 0.5 to about 15×10⁶ Pa, especially within the range from about 2 to about 6×10⁶ Pa (values in brackets: without catalyst).

In stage 2, the temperature and pressure are selected so as to obtain a first gas phase and a first liquid or first solid phase or a mixture of first liquid and first solid phases, and so that the first gas phase is separated from the first liquid or first solid phase or from the mixture of first liquid and first solid phases.

The first gaseous phase, which consists essentially of ammonia and water vapor, is generally removed continuously by means of a distillation apparatus, for example a distillation column. Any organic constituents of the distillate co-removed in the course of this distillation, predominantly unconverted dinitrile and diamine, can be wholly or partly recycled into stage 1 and/or stage 2.

The residence time of the reaction mixture in stage 2 is not subject to any restrictions whatsoever, but is generally within the range from about 10 minutes to about 5 hours, preferably within the range from about 30 minutes to about 3 hours.

The product line between the first and second stages optionally contains packing elements, for example Raschig rings or Sulzer mixing lements, which allow a controlled expansion of the reaction mixture into the gas phase. This relates, in particular, to the single-phase procedure.

Preferably, the reactor of the second stage likewise contains the catalyst material of the invention, especially in pellet form. The reactor provides a further improvement in product properties compared with a catalyst-free reactor especially at higher pressures and/or in the presence of a large amount of excess water in the synthesis mixture. Temperature and pressure should be selected in such a way that the viscosity of the synthesis mixture remains sufficiently small to prevent any blinding of the catalyst surface. According to the invention, the point of exit from the second process stage too is equipped with sieves or filters which guarantee the purity of the synthesis mixture and separate the catalyst from the synthesis mixture.

In stage 3, the first liquid or the first solid phase or the mixture of first liquid and first solid phases is admixed with a gaseous or liquid phase comprising water, preferably water or water vapor. This is done continuously. The amount of water added (as liquid) is preferably within the range from about 50 to about 1500 ml, more preferably within the range from about 100 to about 500 ml, based in each case on 1 kg of the first liquid or first solid phase or of the mixture of first liquid and first solid phase. This addition of water primarily compensates the water losses incurred in stage 2 and furthers the hydrolysis of acid amide groups in the synthesis mixture. This results in a further advantage of this invention,that the mixture of the starting materials as used in stage 1 can be used with a small excess of water only.

The water-comprising gaseous or liquid phase is preferably preheated in a heat exchanger before being introduced into stage 3 and then mixed with the first liquid or the first solid phase or the mixture of first solid and first liquid phase. The reactor may optionally be fitted with mixing elements which further the mixing of the components. Stage 3 can be operated at a temperature from 150 to 370° C. and a pressure from 0.1 to $30 \times 10^6$ Pa; if a catalyst bed according to the invention is present, the conditions applicable to stage 1 can be employed. Otherwise, the temperature is preferably 180–300° C., particularly preferably 220–280° C. The pressure is preferably from 1 to $10 \times 10^6$ Pa, particularly preferably from $2 \times 10^6$ to $7 \times 10^6$ Pa.

The pressure and temperature can be adjusted to each other in such a way that the synth sis mixture is present as a single liquid or solid phase. In another embodiment, the pressure and temperature are selected so that a liquid or a solid phase or a mixture of solid and liquid phase and also a gaseous phase are obtained. In this embodiment, the liquid or solid phase or the mixture of liquid and solid phases corresponds to the product mixture, whereas the gaseous phase is separated off. As part of this stage, the gaseous phase can be separated from the liquid or solid phase or from the mixture of solid and liquid phases at once, or the synthesis mixture forming within this stage can be present in two-phase form: liquid/gaseous, solid/gaseous or liquid-solid/gaseous.

The pressure can be adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

The apparatus/reactors usable in this stage can be identical to those of stage 1, discussed above.

The residence time in this stage is likewise not subject to any restrictions, but economic reasons generally dictate a range from about 10 minutes to about 10 hours, preferably about 60 to about 8 hours, particularly preferably about 60 minutes to about 6 hours.

The product mixture obtained in stage 3 can be further processed as described below.

In a preferred embodiment, the product mixture of stage 3 is, subjected to a postcondensation in stage 4 at temperatures from about 200 to about 350° C., preferably at temperatures from about 220 to 300° C., especially from about 240 to 270° C. Stage 4 is carried out at a pressure which is below the pressure of stage 3 and is preferably within the, range from about 5 to $1000 \times 10^3$ Pa, more preferably within the range from about 10 to about $300 \times 10^3$ Pa. In the context of this stage, the temperature and pressure are selected so as to obtain a second gas phase and a second liquid or solid phase or a mixture of second liquid and second solid phases which comprise the polyamide.

The postcondensation of stage 4 is preferably carried out in such a way that the relative viscosity (measured at a temperature of 25° C. and a concentration of 1 g of polymer per 100 ml in 96% strength by weight of sulfuric acid) of the polyamide assumes a value within the range from about 1.6 to about 3.5.

In a preferred embodiment, any water present in the liquid phase can be expelled by means of an inert gas such as nitrogen.

The residence time of the synthesis mixture in stage 4 depends especially on the desired relative viscosity, the temperature, the pressure and the amount of water added in stage 3.

If stage 3 is operated as a single-phase regime, the product line between stage 3 and stage 4 may optionally contain packing elements, for example Raschig rings or Sulzer mixing elements, which allow a controlled expansion of the synthesis mixture in the gas phase.

The fourth stage too can be operated using the catalyst of the invention. The use of the catalyst in stage 4 improves the molecular weight buildup especially when the relative viscosity of the effluent from the third or—in the case of the three-stage procedure—second stage is less than RV=1.6—and/or the molar nitrile group and acid amide content in the polymer is greater than 1%, each based on the sum of the moles of dinitrile and diamine used.

In a further embodiment of the invention, stage 3 may be dispensed with and the polyamide is prepared by carrying out stages (1), (2) and (4).

This variant is preferably carried out as follows:

In stage 1, the reaction is carried out as described above. The reaction mixture is treated in stage 2 as described above or at a temperature within the range from about 220 to about 300° C. and a pressure within the range from about 1 to about $7 \times 10^6$ Pa, the pressure in stage 2 being at least $0.5 \times 10^6$ Pa lower than in stage 1. At the same time, the resulting first gas phase is separated from the first liquid phase.

The first liquid phase obtained in stage 2 is treated in stage 4 as in stage 1 or at a temperature within the range from about 220 to 300° C. and a pressure within the range from about 10 to about $300 \times 10^3$ Pa, the resulting second, water- and ammonia-containing gas phase being separated from the second liquid phase. Within this stage, the relative viscosity (measured as defined above) of the resulting polyamide is adjusted to a desired value within the range from about 1.6 to about 3.5 through choice of temperature and residence time.

The resulting second liquid phase is then conventionally discharged and, if desired, worked up.

In a further preferred embodiment of the present invention, at least one of the gas phases obtained in the respective stages can be recycled into at least one of the preceding stages.

It is further preferable to select the temperature and pressure in stage 1 or in stage 3 or in both stage 1 and stage 3 so as to obtain a liquid or a solid phase or a mixture of liquid and solid phases and a gaseous phase and to separate off the gaseous phase.

Figure 1:
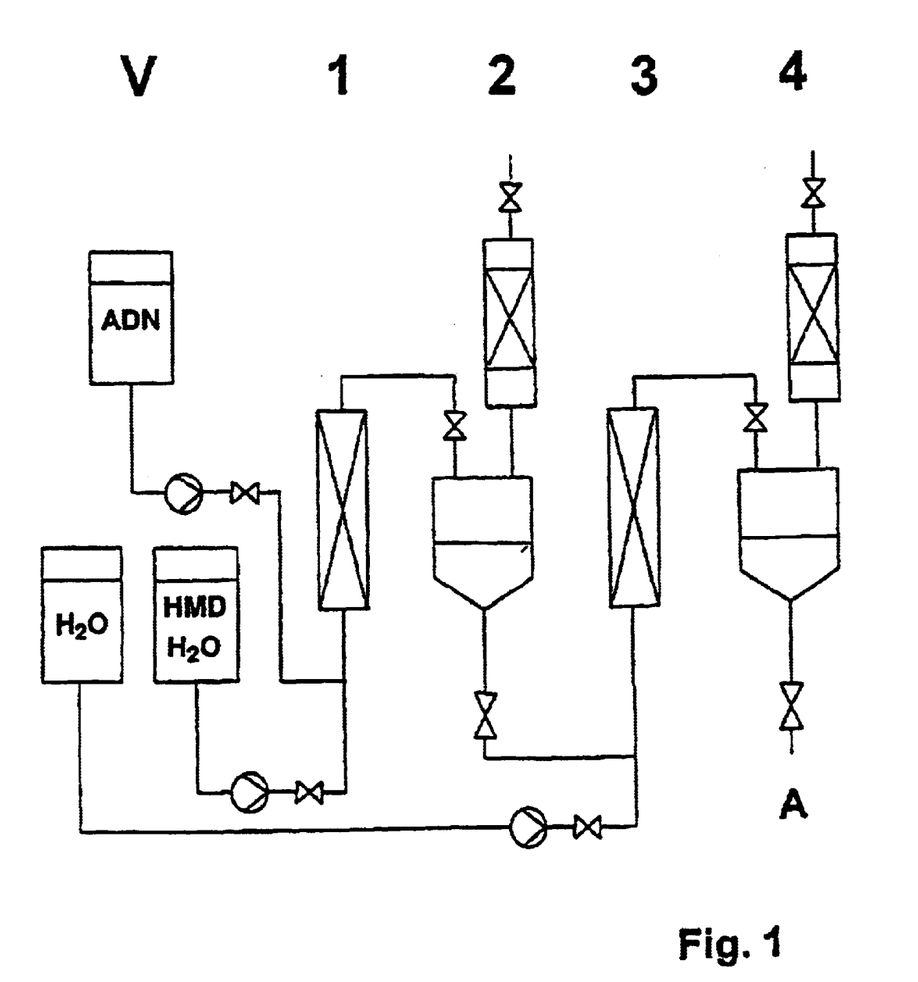
FIG. 1 illustrates an apparatus for carrying out the process of the invention.

| Key to abbreviations: | |
|---|---|
| V: | feed |
| ADN: | adiponitrile |
| HMD: | hexamethylenediamine |
| 1: | stage 1 |
| 2: | stage 2 |
| 3: | stage 3 |
| 4: | stage 4 |
| A: | effluent |

Furthermore, in the context of the process of the invention, it is also possible to carry out a chain extension or branching or a combination thereof. For this purpose, polymer branching or chain-extending substances known to a person skilled in the art are added in the individual stages. These substances are preferably added in stage 3 or 4.

Usable substances are:

Trifunctional amines or carboxylic acids as branchers or crosslinkers. Examples of suitable at least trifunctional amines or carboxylic acids are described in EP-A-0 345 648. The at least trifunctional amines have at least three amino groups which are capable of reaction with carboxylic acid groups. They preferably do not have any carboxylic acid groups. The at least trifunctional carboxylic acids have at least three carboxylic acid groups which are capable of reaction with amines and which can also be present, for example, in the form of their derivatives, such as esters. The carboxylic acids preferably do not contain any amino groups capable of reaction with carboxylic acid groups. Examples of suitable carboxylic acids are trimesic acid, trimerized fatty acids, prepared for example from oleic acid and having from 50 to 60 carbon atoms, naphthalenepolycarboxylic acids, such as naphthalene-1,3,5,7 tetracarboxylic acid. The carboxylic acids are preferably defined organic compounds and not polymeric compounds.

Examples of amines having at least 3 amino groups are nitrilotrialkylamine, especially nitrilotriethaneamine, dialkylenetriamines, especially diethylenetriamine, trialkylenetetramines and tetraalkylenepentamines, the alkylene moieties preferably being ethylene moieties. Furthermore, dendrimers can be used as amines. Dendrimers preferably have the general formula I (I)

where

R is H or $-(CH_2)_n-NR^1_2$ where
$R^1$ is H or $-(CH_2)_n-NR^2_2$ where
$R^2$ is H or $-(CH_2)_n-NR^3_2$ where
$R^3$ is H or $-(CH_2)_n-NH_2$,
n is an integer from 2 to 6, and
x is an integer from 2 to 14.

Preferably, n is 3 or 4, especially 3, and x is an integer from 2 to 6, preferably from 2 to 4, especially 2. The radicals R can also have the stated meanings independently of one another. Preferably, R is a hydrogen atom or a $-(CH_2)_n-NH_2$ radical.

Suitable carboxylic acids are those having from 3 to 10 carboxylic acid groups, preferably 3 or 4 carboxylic acid groups. Preferred carboxylic acids are those having aromatic and/or heterocyclic nuclei. Examples are benzyl, naphthyl, anthracene, biphenyl, triphenyl radicals or heterocycles such as pyridine, bipyridine, pyrrole, indole, furan, thiophene, purine, quinoline, phenanthrene, porphyrin, phthalocyanine, naphthalocyanine. Preference is given to 3,5,3',5'-biphenyltetracarboxylic acid phthalocyanine, naphthalocyanine, 3,5,5',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, particularly preferably 1,3,5-benzenetricarboxylic acid (trinesic acid) and 1,2,4,5-benzenetetracarboxylic acid. Such compounds are commercially available or can be prepared by the process described in DE-A-43 12 182. If ortho-substituted aromatic compounds are used, imide formation is preferably prevented through the choice of suitable reaction temperatures.

These substances are at least trifunctional, preferably at least tetrafunctional. The number of functional groups can be from 3 to 16, preferably from 4 to 10, particularly preferably from 4 to 8. The processes of the invention are carried out using either at least trifunctional amines or at least trifunctional carboxylic if acids, but not mixtures of such amines or carboxylic acids. However, small amounts of at least trifunctional amines may be present in the trifunctional carboxylic acids, and vice versa.

The substances are present in an amount from 1 to 50 μmol/g of polyamide, preferably from 1 to 35, particularly preferably from 1 to 20, μmol/g of polyamide. The substances are preferably present in an amount from 3 to 150, particularly preferably from 5 to 100, especially from 10 to 70, μmol/g of equivalents of polyamide. The equivalents are based on the number of functional amino groups or carboxylic acid groups.

Difunctional carboxylic acids or difunctional amines serve as chain lengtheners. These have 2 carboxylic acid groups which can be reacted with amino groups, or 2 amino groups which can be reacted with carboxylic acids. The difunctional carboxylic acids or amines, besides the carboxylic acid groups or amino groups, do not contain any further functional groups capable of reaction with amino groups or carboxylic acid groups. Preferably, they do not contain any further functional groups. Examples of suitable difunctional amines are those which form salts with difunctional carboxylic acids. They can be linear aliphatic, such as $C_{1-14}$-alkylenediamine, preferably $C_{2-6}$-alkylenediamine, for example hexylenediamine. They can also be cycloaliphatic. Examples are isophoronediamine, dicycycan, laromine. Branched aliphatic diamines are likewise usable, an example being Vestamin TMD (trimetbylhexamethylonediamine, from Hüls AG). Entire amines can each be substituted by $C_{1-12}$-alkyl, preferably $C_{1-14}$-alkyl, radicals on the carbon skeleton.

Difunctional carboxylic acids are for example those which form salts with difunctional diamines. They can be linear aliphatic dicarboxylic acids, which are preferably $C_{4-20}$-dicarboxylic acids. Examples are adipic acid, azelaic acid, sebacic acid, suberic acid. They can also be aromatic. Examples are isophthalic acid, terephthalic acid, naphthalenedicarboxylic acid, as well as dimerized fatty acids.

The difunctional basic building blocks (c) are preferably used in amounts from 1 to 55, particularly preferably from 1 to 30, especially from 1 to 15, μm/g of polyamide.

Advantageously, the product mixture obtained in stage 3, or the second liquid or second solid phase or the mixture of second liquid and second solid phases (from stage 4) which comprise the polyamide, preferably a polymer melt, is discharged from the reaction vessel in a conventional manner, for example by means of a pump. Subsequently, the polyamide obtained can be worked up according to conventional methods, as described for example in DE-A 43 21 683 (page 3 line 54 to page 4 line 3) at length.

In a preferred embodiment, the level of cyclic diner in the nylon-6 obtained according to the invention can be further reduced by extracting the polyamide first with an aqueous solution of caprolactam and then with water and/or subjecting it to a gas phase extraction (described in EP-A-0 284 968, for example). The low molecular weight constituents obtained in this aftertreatment, such as caprolactam, linear caprolactam oligomer and cyclic caprolactam oligomer, can be recycled into the first and/or second and/or third stage.

The starting mixture and the synthesis mixture can be admixed in all stages with chain regulators such as aliphatic and aromatic carboxylic and dicarboxylic acids, and catalysts such as acid-containing phosphorus compounds in amounts within the range from 0.01 to 5% by weight, preferably within the range from 0.2 to 3% by weight, based on the amount of polyamide-forming monomers and aminonitriles used. Suitable chain regulators include for example propionic acid, acetic acid, benzoic acid, terephthalic acid and triacetonediamine.

Additives and fillers such as pigments, dyes and stabilizers are generally added to the synthesis mixture prior to pelletization, preferably in the second, third and fourth stages. Particular preference is given to using fillers and additives whenever the synthesis or polymer mixture will not encounter fixed bed catalysts in the rest of the processing. One or more impact-modifying rubbers may be present in the compositions as additives in amounts from 0 to 40% by weight, preferably from 1 to 30% by weight, based on the entire composition.

It is possible to use, for example, customary impact modifiers which are suitable for polyamides and/or polyarylene ethers.

Rubbers which enhance the toughness of polyamides generally have two essential features: they have an elastomeric portion which has a glass transition temperature of less than −10° C., preferably less than −30° C., and they contain at least one functional group which is capable of interaction with the polyamide. Suitable functional groups include for example carboxylic acid, carboxylic anhydride, carboxylic ester, carboxylic amide, carboxylic izide, amino, hydroxyl, epoxide, urethane and oxazoline groups.

Rubbers which enhance the toughness of the blends include for example:

EP and EPDM rubbers grafted with the above functional groups. Suitable grafting reagents include for example maleic anhydride, itaconic acid, acrylic acid, glycidyl acrylate and glycidyl methacrylate.

These monomers can be grafted onto the polymer in the melt or in solution, in the presence or absence of a free-radical initiator such as cumene hydroperoxide.

The copolymers of α-olefins described under the polymers A, including especially the ethylene copolymers, may also be used as rubbers instead of polymers A and be mixed as such into the compositions of the invention.

A further group of suitable elastomers are core-shell graft rubbers. These are graft rubbers which are produced in emulsion and which have at least one hard and one soft constituent. A hard constituent is customarily a polymer having a glass transition temperature of at least 25° C., while a soft constituent is a polymer having a glass transition temperature of not more than 0° C. These products have a structure made up of a core and at least one shell, the structure being the result of the order in which the monomers are added. The soft constituents are generally derived from butadiene, isofpene, alkyl acrylates, alkyl methacrylates or siloxanes and optionally further comonomers. Suitable siloxane cores can be prepared for example starting from cyclic oligomeric octamethyltetrasiloxane or tetravinyltetramethyltetrasiloxane. These can be, for example, reacted with γ-mercaptopropylmethyldimethoxysilane in a ring-opening cationic polymerization, preferably in the presence of sulfonic acids, to form the soft siloxane cores. The siloxanes can also be crosslinked by, for example, conducting the polymerization reaction in the presence of silanes having hydrolyzable groups such as halogen or alkoxy groups such as tetraethoxysilane, methyltrimethoxysilane or phenyltrimethoxysilane. Suitable comonomers here include for example styrene, acrylonitrile and crosslinking or grafting monomers having more than one polymerizable double bond such as diallyl phthalate, divinylbenzene, butanediol diacrylate or triallyl (iso)cyanurate. The hard constituents are generally derived from styrene, α-methylstyrene and copolymers thereof, preferred comonomers being acrylonitrile, methacrylonitrile and methyl methacrylate.

Preferred core-shell graft rubbers have a soft core and a hard shell or a hard core, a first soft shell and at least one further hard shell. The incorporation of functional groups such as carbonyl, carboxylic acid, acid anhydride, acid aride, acid imide, carboxylic ester, amino, hydroxyl, epoxy, oxazoline, urethane, urea, lactam or halobenzyl groups is here preferably effected by the addition of suitably functionalized monomers during the polymerization of the last shell. Suitable functionalized monomers include for example naleic acid, maleic anhydride, mono- or diesters or maleic acid, tert-butyl (meth)acrylate, acrylic acid; glycidyl (meth)acrylate and vinyloxazoline. The proportion of monomers having functional groups is generally within the range from 0.1 to 25% by weight, preferably within the range from 0.25 to 15% by weight, based on the total weight of the core-shell graft rubber. The weight ratio of soft to hard constituents is generally within the range from 1:9 to 9:1, preferably within the range from 3:7 to 8:2.

Such rubbers, which enhance the toughness of polyamides, are known per se and described in EP-A-0 208 187, for example.

A further group of suitable impact modifiers are thermoplastic polyester elastomers. Polyester elastomers are segmented copolyetheresters containing long-chain segments, generally derived from poly(alkylene) ether glycols, and short-chain segments, derived from low molecular weight diols and dicarboxylic acids. Such products are known per se and are described in the literature, for example in U.S. Pat. No. 3,651,014. Corresponding products are also commercially available under the names of Hytrel® (Du Pont), Arnitel® (Akzo) and Pelprene® (Toyobo Co. Ltd.).

It will be appreciated that it is also possible to use mixtures of different rubbers.

As further additives there may be mentioned for example processing aids, stabilizers and oxidation retardants, agents against thermal decomposition and decomposition by ultraviolet light, lubricating and demolding agents, flame retardants, dyes and pigments and plasticizers. The proportion thereof is generally up to 40%, preferably up to 15%, by weight, based on the total weight of the composition.

Pigments and dyes are generally present in amounts of up to 4%, preferably from 0.5 to 3.5%, especially from 0.5 to 3%, by weight.

The pigments for coloring thermoplastics are commonly known, see for example R. Gächter and H. Müller, Taschenbuch der Kunststoffadditive, Carl Hanser Verlag, 1983, pages 494 to 510. The first preferred group of pigments to be mentioned are white pigments such as zinc oxide, zinc sulfide, lead white (2 $PbCO_3$ $Pb(OH)_2$), lithopone, antimony white and titanium dioxide. Of the two most common crystal polymorphs (rutile and anatase) of titanium dioxide, the rutile form is preferred for use as white pigment for the molding compositions of the invention.

Black pigments which can be used according to the invention are iron oxide black ($Fe_3O_4$), spinel black ($Cu(Cr, Fe)_2O_4$), manganese black (mixture of manganese dioxide, silicon dioxide and iron oxide), cobalt black and antimony black and also, particularly preferably, carbon black, which is usually used in the form of furnace or gas black (see G. Benzing, Pigmente für Anstrichmittel, Expert-Verlag (1988), p. 78ff).

It will be appreciated that inorganic color pigments such as chromium oxide green or organic color pigments such as azo pigments and phthalocyanines can be used according to the invention to obtain certain hues. Such pigments are generally commercially available.

It can further be of advantage to use the abovementioned pigments or dyes in a mixture, for example carbon black with copper phthalocyanines, since this generally facilitates the dispersion of color in the thermoplastic.

Oxidation retardants and thermal stabilizers which can be added to the thermoplastic compositions of the invention include for example. halides of metals of group I of the periodic table, e.g., sodium halides, potassium halides, lithium halides, optionally in conjunction with copper(I) halides, for example chlorides, bromides or iodides. The halides, especially of copper, may also contain electron-rich p-ligands. Examples of such copper complexes are copper halide complexes with triphenylphosphine, for example. It is further possible to use zinc fluoride and zinc chloride. Other possibilities are sterically hindered phenols, hydroquinones, substituted representatives of this group, secondary aromatic amines, optionally in conjunction with phosphorus-containing acids and salts thereof, and mixtures of these compounds, preferablyin a concentration of up to 1% by weight, based on the weight of the mixture.

Examples of UV stabilizers are various substituted resorcinols, salicylates, benzotriazoles and benzophenones, which are ogenerally used in amounts of up to 2% by weight.

Lubricating and demolding agents, which are generally included in the thermoplastic composition in amounts of up to 1% by weight, are stearic acid, stearyl alcohol, alkyl stearates and N-alkylstearamides and also esters of pentaerythritol with long-chain fatty acids. It is also possible to use salts of calcium, of zinc or of aluminum of stearic acid and also dialkyl ketones, for example distearyl ketone.

We claim:

1. The process for preparing a polyamide by reacting at least one dinitrile and at least one diamine with water at a temperature from 90 to 400° C. and a pressure from 0.1 to $50*10^6$ Pa in a molar ratio of at least 1:1 for water to the sum total of dinitrile and diamine in the presence of a heterogeneous catalyst selected from the group consisting of aluminum oxide, tin oxide, silicon oxide, oxides of the second to sixth transition group of the periodic table, oxides of the lanthanides and actinides, sheet-silicates and zeolites.

2. The process of claim 1, wherein the catalyst used is selected from the group consisting of beta-zeolite, sheet-silicate and titanium dioxide.

3. The process of claim 1, wherein the catalyst used is a titanium dioxide advantageously comprising from 70 to 100% by weight of anatase and from 0 to 30% by weight of rutile, in which catalyst up to 40% by weight of titanium dioxide may be replaced by tungsten oxide.

4. The process of claim 1, wherein up to 40% by weight of the titanium oxide in the titanium oxide is replaced by tungsten oxide.

5. A continuous process as claimed in claim 1.

6. A batch process as claimed in claim 1.

7. A continuous process for preparing a polyamide by reacting at least one dinitrile and at least one diamine with water, which comprises:

(1) reacting at least one dinitrile and at least one diamine with water at a temperature from 90 to 400° C. and a pressure from 0.1 to $35\times10^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure instage 1 in the presence or absence of a Brönsted acid catalyst selected from a beta-zeolite catalyst, a sheet-silicate catalyst or titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phases, and so that the first gas phase is separated from the first liquid or the first solid phase or from the mixture of first liquid and first solid phases, and (3) admixing the first liquid or the first solid phase or the mixture of first liquid and first solid phases with a gaseous or liquid phase comprising water at a temperature from 150 to 370° C. and a pressure from 0.1 to $30\times10^6$ Pa to obtain a product mixture.

8. A continuous process for preparing a polyamide by reacting at least one dinitrile and at least one diamine with water, which comprises:

(1) reacting at least one dinitrile and at least one diamine with water at a temperature from 90 to 400° C. and a pressure from 0.1 to $35\times10^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure in stage 1 in the presence or absence of a Brönsted acid catalyst selected from a beta-zeolite catalyst, a sheet-silicate catalyst or titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phases, and so that the first gas phase is separated from the first liquid or the first solid phase or from the mixture of first liquid and first solid phases, and (3) admixing the first liquid or the first solid phase or the mixture of first liquid and first solid phases with a gaseous or liquid phase comprising water at a temperature from 150 to 370° C. and a pressure from 0.1 to $30\times10^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a product mixture.

9. A process as claimed in claim 7, further comprising the following stage:

(4) postcondensing the product mixture at a temperature from 200 to 350° C. and a pressure which is lower than the pressure in stage 3, the temperature and pressure being selected so as to obtain a second, water- and ammonia-containing gas phase and a second liquid or second solid phase or a mixture of second liquid and second solid phases, which each include the polyamide.

10. A continuous process for preparing a polyamide by reacting at least one dinitrile and at least one diamine with water, which comprises:

(1) reacting at least one dinitrile and at least one diamine with water at a temperature from 90 to 400° C. and a pressure from 0.1 to 35×10⁶ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure in stage 1 in the presence or absence of a Brönsted acid catalyst selected from a beta-zeolite catalyst, a sheet-silicate catalyst or titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phases, and so that the first gas phase is separated from the first liquid or the first solid phase or from the mixture of first liquid and first solid phases, and (4) postcondensing the first liquid or the first solid phase or the mixture of first liquid and first solid phases at a temperature from 200 to 350° C. and a pressure which is lower than the pressure in stage 3, the temperature and pressure being selected so as to obtain a second, water- and ammonia-containing gas phase and a second liquid or second solid phase or a mixture of second liquid and second solid phases, which each include(s) the polyamide.

11. A process as claimed in claim 7, wherein the temperature and pressure in stage 1 or in stage 3 or in both stage 1 and stage 3 are selected so as to obtain a liquid or a solid phase or a mixture of liquid and solid phases and so that a gaseous phase, and the gaseous phase is separated off.

12. A process as claimed in claim 7, wherein the reaction of stage 1 is carried out using a molar ratio from 1:1 to 1:30 for the sum total of dinitrile and diamine to water.

13. A process as claimed in claim 7, wherein in stage 3 the gaseous or liquid phase which contains water is added in an amount from 50 to 1500 ml of water per 1 kg of first liquid or first solid phase or mixture of first liquid and first solid phases.

14. A process as claimed in claim 7, wherein at least one of the gas phases obtained in the respective stages is recycled into at least one of the preceding stages.

15. A process as claimed in claim 1, wherein the dinitrile used is an alpha,omega-alkylenedinitrile having an alkylene moiety (—$CH_2$—) of from 3 is 11 carbon atoms or an alkylaryl dinitrile of from 7 to 12 carbon atoms.

16. A process as claimed in claim 1, wherein the dinitrile used is adiponitrile.

17. A process as claimed in claim 1, wherein the diamine used is an alpha,omega-alkylenediamine having an alkylene moiety (—$CH_2$—) of from 3 to 14 carbon atoms or an alkylaryldiamine of from 9 to 14 carbon atoms.

18. A process as claimed in claim 1, wherein the diamine used is hexamethylenediamine.

19. A process as claimed in claim 1, wherein the following mixture is used:

| from 50 | to 99.99% by weight | of total dinitrile and diamine, |
|---|---|---|
| from 0.01 | to 50% by weight | of at least one dicarboxylic acid selected from the group consisting of aliphatic $C_4$–$C_{10}$-α, ω-dicarboxylic acids aromatic $C_8$–$C_{12}$ dicarboxylic acids and $C_5$–$C_8$ -cycloalkanedicarboxylic acids, |
| from 0 | to less than 50% by weight of | an aminonitrile and also from 0 to 50% by weight of an α,ω-$C_5$–$C_{12}$-amino acid or of the corresponding lactam, |
| from 0 | to 10% by weight | of at least one inorganic acid or salt thereof, | the individual weight percentages adding up to 100%.

20. A process as claimed in claim 1, wherein the diamine is used in the form of a solution in water.

21. A polyamide preparable by a process as claimed in any of claims 1 to 20.

* * * * *

UNITED STATES PATENT AND TRADEMARK OFFICE
CERTIFICATE OF CORRECTION

PATENT NO. : 6,699,960 B1
DATED : March 2, 2004
INVENTOR(S) : Ohlbach et al.

It is certified that error appears in the above-identified patent and that said Letters Patent is hereby corrected as shown below:

<u>Title page,</u>
Item [45], Date of Patent should read -- Mar. 2, 2004 --

<u>Column 17,</u>
Line 25, after "liquid" insert -- phase--;
Line 26, delete "phase".

<u>Column 18,</u>
Line 9, "3 is 11" should be -- 3 to 11 --.

Signed and Sealed this

Twenty-first Day of December, 2004

JON W. DUDAS
*Director of the United States Patent and Trademark Office*